US012281480B2

(12) United States Patent
Lingg

(10) Patent No.: US 12,281,480 B2
(45) Date of Patent: *Apr. 22, 2025

(54) WALL OR FLOOR COVERING ELEMENT

(71) Applicant: LI & CO AG, Müstair (CH)

(72) Inventor: Edwin Lingg, Schluderns (IT)

(73) Assignee: LI & CO AG, Müstair (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,446

(22) Filed: Sep. 1, 2023

(65) Prior Publication Data

US 2023/0407645 A1 Dec. 21, 2023

Related U.S. Application Data

(63) Continuation of application No. 17/893,517, filed on Aug. 23, 2022, now Pat. No. 11,781,321, which is a (Continued)

(30) Foreign Application Priority Data

Mar. 23, 2016 (EP) .................................... 16161925

(51) Int. Cl.
*E04F 13/08* (2006.01)
*B44C 1/24* (2006.01)
(Continued)

(52) U.S. Cl.
CPC ............ *E04F 13/0894* (2013.01); *B44C 1/24* (2013.01); *B44C 5/04* (2013.01); *E04F 13/0871* (2013.01);
(Continued)

(58) Field of Classification Search
CPC .......... B44C 1/24; B44C 5/04; E04F 13/0871; E04F 13/0894; E04F 13/16;
(Continued)

(56) References Cited

U.S. PATENT DOCUMENTS 4,378,401 A 3/1983 Wright
4,428,775 A 1/1984 Johnson
(Continued)

FOREIGN PATENT DOCUMENTS

CN 103492175 A 1/2014
CN 108779646 A 11/2018
(Continued)

OTHER PUBLICATIONS

European Search Report for Application No. 16161925.9 dated Nov. 18, 2016.

(Continued)

*Primary Examiner* — James M Ference
(74) *Attorney, Agent, or Firm* — KDW FIRM PLLC

(57) ABSTRACT

A covering element includes a carrier plate including at least mineral particles pressed together to a plate by a polymeric adhesion agent, complementary recesses and protrusions formed, respectively, on opposing lateral edges of the carrier plate, so in an assembled condition of two or more covering elements, the complementary recesses and protrusions can engage with complementary protrusions and recesses, respectively, of another of the two or more covering elements, a decor layer including a polymer and on a front side of the carrier plate, the decor layer including at least at least one, color pigment-containing, printing layer and a polymer-containing transparent top layer containing polyurethane or acrylic.

13 Claims, 1 Drawing Sheet

Related U.S. Application Data continuation of application No. 17/136,875, filed on Dec. 29, 2020, now Pat. No. 11,454,035, which is a continuation of application No. 16/137,169, filed on Sep. 20, 2018, now Pat. No. 10,883,276, which is a continuation of application No. PCT/IB2017/051651, filed on Mar. 22, 2017.

(51) Int. Cl.

| | |
|---|---|
| ***B44C 5/04*** | (2006.01) |
| ***E04F 13/16*** | (2006.01) |
| ***E04F 15/02*** | (2006.01) |
| ***E04F 15/10*** | (2006.01) |

(52) U.S. Cl.

CPC ........ *E04F 13/16* (2013.01); *E04F 15/02005* (2013.01); *E04F 15/02038* (2013.01); *E04F 15/102* (2013.01); *E04F 15/107* (2013.01); *E04F 2201/03* (2013.01)

(58) Field of Classification Search

CPC .......... E04F 15/02005; E04F 15/02038; E04F 15/102; E04F 15/107; E04F 2201/03

USPC .......................................................... 52/588.1

See application file for complete search history.

(56) References Cited

U.S. PATENT DOCUMENTS

| | | | | |
|---|---|---|---|---|
| 5,422,179 | A | 6/1995 | Dietschi | |
| 6,841,023 | B2 * | 1/2005 | Mott | B44C 5/0476<br>264/122 |
| 7,785,703 | B2 | 8/2010 | Agrawal | |
| 8,287,997 | B2 | 10/2012 | Paradis | |
| 9,239,547 | B2 | 1/2016 | Ueda | |
| 9,404,261 | B2 | 8/2016 | Johnson | |
| 10,883,276 | B2 | 1/2021 | Lingg | |
| 11,454,035 | B2 | 9/2022 | Lingg | |
| 11,781,321 | B2 * | 10/2023 | Lingg | B44C 1/24<br>52/588.1 |
| 2002/0146954 | A1 | 10/2002 | Drees | |
| 2002/0160680 | A1 | 10/2002 | Laurence | |
| 2002/0179220 | A1 | 12/2002 | Cottier | |
| 2005/0064164 | A1 | 3/2005 | Dubey | |
| 2005/0070636 | A1 | 3/2005 | Lee | |
| 2005/0181693 | A1 | 8/2005 | Kajander | |
| 2005/0234582 | A1 * | 10/2005 | Berdan, II | B26D 7/27<br>700/125 |
| 2005/0262787 | A1 * | 12/2005 | Goss | B44C 5/0461<br>52/311.1 |
| 2006/0032175 | A1 | 2/2006 | Chen | |
| 2007/0003791 | A1 | 1/2007 | Rochette | |
| 2007/0093159 | A1 | 4/2007 | Kajander | |
| 2007/0110970 | A1 | 5/2007 | Dubey | |
| 2008/0106568 | A1 | 5/2008 | Albrecht | |
| 2008/0299372 | A1 | 12/2008 | Stidham | |
| 2009/0004378 | A1 | 1/2009 | Jones | |
| 2009/0162651 | A1 | 6/2009 | Rios | |
| 2009/0208714 | A1 | 8/2009 | Currier | |
| 2010/0009102 | A1 | 1/2010 | Vermeulen | |
| 2010/0015420 | A1 | 1/2010 | Riebel et al. | |
| 2010/0059383 | A1 | 3/2010 | Duerig | |
| 2011/0047913 | A1 | 3/2011 | Kim et al. | |
| 2011/0047931 | A1 | 3/2011 | Kim et al. | |
| 2011/0123809 | A1 | 5/2011 | Riebel et al. | |
| 2011/0167744 | A1 | 7/2011 | Whispell et al. | |
| 2011/0247748 | A1 | 10/2011 | Pervan | |
| 2011/0262720 | A1 | 10/2011 | Riebel et al. | |
| 2011/0287237 | A1 | 11/2011 | Riebel et al. | |
| 2012/0015176 | A1 | 1/2012 | Riebel et al. | |
| 2012/0034003 | A1 | 2/2012 | Oda et al. | |
| 2012/0103722 | A1 | 5/2012 | Clausi et al. | |
| 2012/0276348 | A1 | 11/2012 | Clausi et al. | |
| 2012/0291377 | A1 | 11/2012 | Riebel et al. | |
| 2012/0292137 | A1 | 11/2012 | Riebel et al. | |
| 2013/0104478 | A1 | 5/2013 | Meersseman et al. | |
| 2013/0177742 | A1 | 7/2013 | Siebert et al. | |
| 2013/0288024 | A1 | 10/2013 | Clauter et al. | |
| 2014/0017452 | A1 | 1/2014 | Pervan et al. | |
| 2014/0023832 | A1 | 1/2014 | Pervan et al. | |
| 2014/0059970 | A1 | 3/2014 | Reichinger | |
| 2014/0196618 | A1 | 7/2014 | Pervan et al. | |
| 2014/0199531 | A1 | 7/2014 | Pervan et al. | |
| 2014/0199532 | A1 | 7/2014 | Pervan et al. | |
| 2014/0220318 | A1 | 8/2014 | Pervan et al. | |
| 2014/0242342 | A1 | 8/2014 | Vandevoorde et al. | |
| 2014/0256846 | A1 | 9/2014 | Sevignon et al. | |
| 2014/0329064 | A1 | 11/2014 | Dohring et al. | |
| 2014/0377568 | A1 | 12/2014 | Riebel et al. | |
| 2015/0017461 | A1 | 1/2015 | Lindgren et al. | |
| 2015/0086773 | A1 | 3/2015 | Grundy et al. | |
| 2015/0114552 | A1 * | 4/2015 | Cernohous | C08K 3/36<br>264/483 |
| 2015/0158241 | A1 | 6/2015 | Dohring et al. | |
| 2015/0197943 | A1 | 7/2015 | Ziegler et al. | |
| 2015/0210055 | A1 * | 7/2015 | Pervan | B32B 27/304<br>524/388 |
| 2015/0233127 | A1 | 8/2015 | Dohring | |
| 2015/0251486 | A1 | 9/2015 | Hanning | |
| 2015/0258716 | A1 | 9/2015 | Hanning | |
| 2015/0258845 | A1 | 9/2015 | Hanning | |
| 2015/0290968 | A1 * | 10/2015 | Hannig | B23B 41/00<br>83/16 |
| 2015/0298426 | A1 | 10/2015 | Hanning | |
| 2015/0336358 | A1 * | 11/2015 | Dodge | B32B 27/30<br>428/317.1 |
| 2015/0337542 | A1 * | 11/2015 | Cappelle | E04F 15/10<br>52/309.1 |
| 2015/0337545 | A1 | 11/2015 | Granados Pelaez et al. | |
| 2015/0343739 | A1 | 12/2015 | Pervan | |
| 2015/0368912 | A1 | 12/2015 | Baert et al. | |
| 2016/0016390 | A1 | 1/2016 | Lundblad | |
| 2016/0121646 | A1 | 5/2016 | Vermeulen | |
| 2016/0136913 | A1 * | 5/2016 | Hannig | B44C 5/0461<br>425/105 |
| 2016/0258152 | A1 | 9/2016 | Bierschenk et al. | |
| 2016/0375674 | A1 | 12/2016 | Schulte | |
| 2017/0008334 | A1 | 1/2017 | Hoff | |
| 2017/0120564 | A1 | 5/2017 | Schulte | |
| 2019/0085566 | A1 | 3/2019 | Lingg | |
| 2021/0115674 | A1 | 4/2021 | Lingg | |
| 2023/0015495 | A1 * | 1/2023 | Lingg | E04F 15/085 |

FOREIGN PATENT DOCUMENTS

| | | | |
|---|---|---|---|
| EP | 0843763 | A1 | 5/1998 |
| EP | 2202056 | A1 | 6/2010 |
| EP | 2730429 | A1 | 5/2014 |
| EP | 2829415 | A1 | 1/2015 |
| EP | 3222795 | A1 | 9/2017 |
| EP | 3433447 | A1 | 1/2019 |
| RU | 2387768 | A | 7/2009 |
| WO | 9747834 | A1 | 12/1997 |
| WO | 201507844 | A1 | 1/2015 |
| WO | 2015078443 | A1 | 6/2015 |
| WO | 2017163193 | A1 | 9/2017 |

OTHER PUBLICATIONS

International Search Report and Written Opinion for Application No. PCT/IB2017/051651 dated Aug. 21, 2017.

Non-Final Office Action for U.S. Appl. No. 16/137,169 dated Sep. 25, 2019.

First Office Action for Chinese Application No. 201780018968.9 dated Dec. 11, 2019.

Final Office Action for U.S. Appl. No. 16/137,169 dated Feb. 12, 2020.

Advisory Action and AFCP Decision for U.S. Appl. No. 16/137,169 dated Apr. 17, 2020.

Non-Final Office Action for U.S. Appl. No. 16/137,169 dated May 22, 2020.

(56) References Cited

OTHER PUBLICATIONS

Chinese Office Action for Application No. 201780018968.9 dated Jun. 28, 2020.
Notice of Allowance for U.S. Appl. No. 16/137,169 dated Sep. 2, 2020.
Notice of Imported Citations for U.S. Appl. No. 17/136,875 dated Feb. 5, 2021.
Chinese Office Action for Application No. 201780018968.9 dated Mar. 5, 2021.
European Office Action for Application No. 16161925.9 dated Apr. 23, 2021.
Non-Final Office Action for U.S. Appl. No. 17/136,875 dated Mar. 2, 2022.
Notice of Allowance for U.S. Appl. No. 17/136,875 dated Jun. 28, 2022.
Non-Final Office Action for U.S. Appl. No. 17/893,517 dated Dec. 23, 2022.
Final Office Action for U.S. Appl. No. 17/893,517 dated Apr. 4, 2023.
Notice of Allowance for U.S. Appl. No. 17/893,517 dated Jun. 26, 2023.
Notice of Allowance for U.S. Appl. No. 17/893,517 dated Jul. 26, 2023.

* cited by examiner

WALL OR FLOOR COVERING ELEMENT

CROSS-REFERENCE TO RELATED APPLICATIONS

This application is a continuation and claims priority to co-pending U.S. patent application Ser. No. 17/893,517 filed on Aug. 23, 2022, which is a continuation and claims priority to U.S. patent application Ser. No. 17/136,875 filed on Dec. 29, 2020, which is a continuation and claims priority to U.S. patent application Ser. No. 16/137,169 filed on Sep. 20, 2018, which is a continuation of and claims priority to PCT patent application number PCT/IB2017/051651 filed on Mar. 22, 2017, which claims priority to EP 16161925.9 filed on Mar. 23, 2016, the entire disclosures of which are incorporated by reference herein.

TECHNICAL FIELD

The present invention relates to a covering element for ceilings, walls or floors for indoor use as well as for outdoor use.

BACKGROUND

Wall or floor covering elements are known, especially for indoor use, which consist of a wood-containing carrier plate or synthetic material, in particular HDF, on which a top layer is provided, wherein the lateral edges of the floor covering element, on the sides facing away from each other, comprise either protrusions or recesses, which, with covering elements arranged next to each other, engage each other in order to enable an easier installation of the covering elements for forming a continuous covering. Such connection often is also called a click connection, as it also enables inexperienced workers to perform a joint-free installation of a covering from a plurality of elements.

SUMMARY

It is an object of the present invention to further develop a covering element such that it is individually configurable and insensitive to moisture and temperature changes.

According to the invention, this object is solved by a covering element with the characteristics disclosed herein. Further, the object is solved by a method for manufacturing a covering element according to the disclosure herein. Advantageous developments of the invention are subject of the associated dependent claims and the further description.

According to the invention, the carrier plate is formed as a mineral carrier plate, i.e. it contains at least one mineral, which is pressed together to a plate by a, for example, polymeric adhesion agent. The pressing can be performed cold or possibly under thermal action. Particles, in particular polymer fibers or natural fibers, may serve as adhesion material and stabilizers, which then, in particular under the influence of temperature and pressure, lead to a good bonding (solidification) of the mineral particles, in particular when the latter are fibrous.

According to a particular advantageous embodiment, the carrier plate is formed as a preferably flat, mineral carrier plate on the basis of cement or with a content of cement of between 25 and 85 percent by volume, preferably between 35 and 50 percent by volume. The carrier plate preferably is realized as a fiber cement board. Such carrier plate further also comprises a reinforcement of fibers, for example, between 1 and 40 percent by volume of reinforcement fibers, preferably between 2 and 20 percent by volume. Reinforcement fibers preferably are glass fibers and/or synthetic fibers, as well as polyvinyl- or polyethylene-based fibers. Further, the fiber cement board may comprise fibers which are needed for manufacturing the plate and which do cause no, or almost no, reinforcement of the plate. The content of these so-called process fibers, for example, fibers of cellulose, jute and/or waste paper, preferably is between 1 and 40 percent by volume, preferably between 2 and 20 percent by volume. Preferably, the plates of this preferred embodiment are manufactured on the basis of the so-called Hatschek method, for example, on the basis of a process as, for example, the process described in U.S. Pat. No. 4,428,775.

The presence of fibers, reinforcement fibers and/or process fibers in the mineral carrier plates applied according to a plurality of preferred embodiments of the invention has important advantages. The reinforcement fibers assign an appropriate locking strength to the recesses and protrusions. The process fibers provide for a suitable adhesion to any kind of decor layers, which are at least partially applied in liquid form, such that the risk of a delamination between decor layer and carrier plate can be reduced.

The advantage of this covering element according to the invention is that it is insensitive to thermal stresses as well as insensitive to moisture.

Preferably, the mineral carrier plate has a thickness between 2 and 30 mm, in particular 2 to 20 mm, preferably 3 to 15 mm, depending on whether the covering element is used as a wall covering, ceiling covering or floor covering or where the floor covering will be located, respectively; for example, at a private home or in a factory hall, self-supporting or resting with its complete surface on the underground.

Preferably, the carrier plate consists of or includes mineral elements pressed together with synthetic material or natural fibers, wherein the synthetic fibers preferably have a volume percentage of 1-40%. Such carrier plate has proven very water-resistant as well as thermally resistant and in particular mechanically stable. Moreover, such carrier plate can easily be provided with a decor layer on its surface.

In an advantageous development of the invention, the carrier plate carries an insulating layer on its back side, in particular an elastomer layer, preferably a foamed polymer, in particular elastomer, or a natural product on the basis of cork or wood, in order to provide in this manner a footfall sound insulation and/or thermal insulation to the underlying layer, the wall, respectively. Such covering elements might also be used for thermal protection on exterior façades. Moreover, this insulation layer also serves as a backing layer, such that the plate does not deform due to one-sided coating.

Preferably, the covering element of the invention comprises a barrier layer at the rear side of the carrier plate against the penetration of moisture and/or vapors from the underside. Such barrier layer may consist, for example, of a material layer applied in liquid form or of a prefabricated layer glued to the rear side. The aforementioned insulation layer may also have the function of a barrier layer. Blocking moisture and/or vapors is advantageous in order to reduce or completely avoid possible tendencies of the covering element to warp. Such warping or tendencies to warp lead to tensions in the covering, such in particular in the area of the mutually engaging recesses and protrusions. These tensions may lead to defects.

In an advantageous development of the invention, the decor layer consists of or includes a color pigment-containing basic layer provided on the carrier plate, on which basic layer, at least partially, a color pigment-containing digital printing layer is provided, on which basic layer, digital printing layer, respectively, at least one polymer-containing transparent top layer is provided, which preferably has a structured surface. The basic layer may also be transparent, thus, free from color pigments, or comprise one or more transparent layers. Due to the digital printing, a decor layer on the basis of a digital print offers a very strong individualization. Thus, for example, different materials, such as wood or leather or stones or fantasy designs can be imitated. The impression caused by the digital print is pronounced by the structured surface, such that with the covering element of the invention arbitrary structures can be simulated very well, such as, for example, wood structures, stone structures and the like.

Preferably, the top layer contains polyurethane or acrylic, which, on the one hand, is very suitable as a wear-resistant top layer and, on the other hand, has the required transparency in order to let the basic layer and/or the digital printing layer show through. Preferably, the top layer contains particles, such as corundum (aluminum oxide) or silicon carbide. These particles result in an increased wear resistance.

Preferably, the top layer contains an electron beam-hardening polymer or a UV-hardening polymer, for example, acrylic-based, wherein the top layer can be deformed, for example, by a structured roller after application on the digital printing layer, basic layer, respectively. In this manner, the surface structure of the covering element can brought into correspondence with a structure simulated by the digital print, such that the virtual structure, such as, for example, a wood or stone surface, is represented in a very realistic manner.

In an alternative embodiment thereto, the top layer consists of or includes a mixed layer of a polymer matrix material with binding characteristics and a filler, which mixed layer preferably is applied on the carrier plate in liquid condition or in solid form, such as plates or roll form. Due to the liquid application, the mixed layer is bonding very well to the mineral-containing carrier plate, and by the corresponding choice of the filler, such as, for example, leather particles, wood or cork particles, a desired structure can be simulated by the mixed layer as well. Therefore, this embodiment is a cost-effective alternative for the digital print.

Preferably, the surface of the mixed layer is structured, which can be achieved, for example, by a treatment with an embossing roller, in particular as long as the mixed layer is not yet hardened after application, in particular at an elevated temperature between 40 and 100 degrees Centigrade.

According to a further alternative embodiment, the decor layer comprises a foil, whether or not printed, or the decor layer consists of such foil. The foil can be based on paper or synthetic material as well as on PVC (Polyvinyl chloride), PP (Polypropylene), PET (Polyethylene terephthalate), Polyolefin and the like. According to the present alternative embodiment, the foil preferably is glued to the carrier plate. For this purpose, preferably a liquid glue application on the carrier plate is performed. Preferably, with this glue application at least a partial penetration into the carrier plate is achieved.

The recesses and protrusions, forming a tongue/groove connection, of the carrier plate can be formed in the carrier plate prior to applying the decor layer or after applying the decor layer. This is possible in particular because the recesses and protrusions are arranged solely in the carrier plate and not in the decor layer.

Preferably, the protrusions and recesses are manufactured such as described in EP 0843763. In other words, the plate preferably is provided with coupling parts at least on the edges of two mutually opposite sides, wherein the plate comprises one or a combination of two or more of the following characteristics:

- the coupling parts are formed in one piece with the carrier plate and cooperate with each other, wherein the coupling parts substantially are realized in the form of a tongue and a groove. It is clear that the groove is an example of a recess according to the invention and the tongue is an example of a protrusion according to the invention;
- the characteristic of the preceding passage, wherein said groove is bordered at least by an upper lip, which ends at a vertical plane, and a lower lip, and wherein said tongue has a tongue region which extends from the tip of the tongue inwards up to said vertical plane, when said plates are joined;
- the characteristic of the preceding passage, wherein the lower lip is elastically bendable and extends beyond the upper lip, wherein the distance with which the lower lip extends beyond the upper lip is smaller than one time the entire thickness of the carrier plate;
- the coupling parts are provided with integrated mechanical locking, which is realized in one piece with the carrier plate, wherein the locking prevents the shifting apart of two covering elements in a direction perpendicular to the respective edge and parallel to the underside of the joined covering elements;
- the characteristic of the preceding passage, wherein said integrated mechanical locking comprises, on the one hand, a protrusion, which is situated on the underside of said tongue, wherein said protrusion extends inward at least partially beyond said vertical plane, and wherein said protrusion comprises a contact surface, and, on the other hand, a recess in the lower lip for receiving said protrusion, wherein said recess comprises a contact surface which cooperates with said contact surface of said protrusion such that a tangent line, which is defined by said contact surfaces when the latter are in mutual contact, is inclined in respect to the surface of the covering elements;
- the characteristic of the preceding passage, wherein said contact surface of the lower lip is situated at least partially in that region of the lower lip which extends beyond the upper lip;
- the characteristic of the preceding passage, wherein said protrusion, said recess and said elastically bendable lower lip are arranged such that they allow a joining or engagement of said covering elements by pushing them laterally towards each other in a substantially planar manner and/or that they allow joining said covering elements by turning;
- the coupling parts provide for an engagement free of play according to all directions in the plane situated perpendicular to the edges of the covering elements.

The invention also relates to a method for manufacturing a wall or floor covering element, in which a mineral carrier plate, i.e. a carrier plate comprising at least one mineral material, is coated with a decor layer, wherein prior to or after applying the decor layer recesses and protrusions are created by milling, on lateral edges of the carrier plate which are facing away from each other, which recesses and protrusions form a tongue/groove connection and which, with covering elements situated next to each other, engage each other form-fittingly. Preferably, the tongue and/or groove is realized by a milling process with at least two successive milling actions, by milling cutters positioned at different angles in respect to the respective covering element. For example, during each of the aforementioned milling actions each time substantially the final shape of a flank, either of the tongue or the groove, can be realized.

In an advantageous development of the invention of the method of the invention, the carrier plate is coated with a basic layer, primer, respectively, which preferably contains a color pigment-containing polymer material. On that basic layer, after drying, at least one color pigment-containing digital printing layer is provided in a digital printing process, on which digital printing layer, after drying, hardening, respectively, at least one polymer-containing transparent top layer, for example, polyurethane or acrylic, is provided, wherein the application is performed at an increased temperature in respect to ambient temperature, in particular in a temperature range of 40-100° C., in particular in a temperature range of 60-100° C. Altogether, apart from colored pigments, also white and black pigments are called color pigments.

In the top layer also, preferably at an increased temperature, in particular at 40-100° C., a surface structure is provided, preferably by embossing with at least one structured embossing roller. In this manner, the covering element will create a desired surface impression, for example, the impression of a wood surface or stone surface, very nicely.

In an alternative method, a decor layer is applied, in particular in liquid condition, on the carrier plate, which decor layer is formed by a mixed layer of a hardenable polymer and a filler. The filler may be stone grains, sand, stone dust, wood fibers, wood flour or leather fibers, powdered leather, respectively. In this way, also by this method, which compared to the digital printing method is considerably simpler, a desired surface effect can be achieved, within certain limits. After applying, the mixed layer is hardened, for example, chemically, thermally or optically (UV). In the mixed layer, also linoleum and/or synthetic fibers and/or stone particles can be introduced.

Preferably, the mixed layer is structured on its surface at an increased temperature, in particular at 40-100° C., in particular by an embossing roller, such that the optical impression created by the mixed layer can be pronounced by the surface structure.

In an advantageous development of this method, the mixed layer is hardened to a modulus of elasticity of 0.05-0.5 GPa. The hardened mixed layer thus has an elasticity within the rubber range, wherein, for example, leather surfaces or rubber surfaces can be imitated very well. Herein, hardening the mixed layer can be performed thermally by UV or chemically.

In the digital printing method, the top layer preferably is applied as a hot coating by a hot embossing roller. The transparent top layer may be a single layer or may contain a plurality of layers stacked on top of each other. In particular, this top layer is formed by at least one layer of an UV-hardening lacquer.

Preferably, the transparent top layer contains wear-resistant particles as well as corundum (Aluminum oxide). These hard particles can be brought into the top layer by means of strewing or can be mixed into the actual material of the top layer and provided together with it. It is possible that the top layer is provided in a plurality of layers and that only some of these layers contain the aforementioned particles.

The advantage of the covering element of the invention is that it is waterproof, absolutely dimensionally stable and not combustible and also hardly develops any smoke/fumes. Thus, it solves all problems arising with traditional wood fiberboards, namely moisture sensitivity and high combustibility, as well as the problems arising with synthetic material boards, namely lack of dimensional stability with temperature variations and combustibility, strong smoke and fumes development, respectively. The mineral carrier plate also is well millable, such that the required recesses and protrusions for forming the tongue/groove connections are easy to mill.

The covering element is suitable as a floor covering, wall covering, ceiling covering or as a façade plate for outdoor use. The mineral carrier plate preferably contains at least one mineral agent known as such, as, for example, ceramics, glass, stone, gypsum, cement, in particular in the form of powder, particles or fibers. The mineral particles or fibers are bonded together by a binding agent, in particular by an adhesion matrix material, in particular natural or synthetic fibers, preferably after thermal pressing or after cold pressing.

As a rule, a covering element according to the invention is rectangular or square, wherein the recesses and protrusions on all four lateral edges are formed such that on two adjacent lateral edges preferably the recesses, or, for example, grooves, are arranged and on the other two adjacent lateral edges the protrusions, or, for example, tongues.

Of course, the mineral carrier plate may be multi-layered. This is the case in particular when the mineral carrier plate relates to a fiber cement board. As mentioned above, such carrier plate can be manufactured according to the Hatschek method. During the Hatschek method, a carrier plate is built from a plurality of sheets of a fiber cement material laminated on top of each other, for example, having the above-described composition for fiber cement boards. A single sheet has a thickness between 0.3 and 1.5 millimeters and preferably between 0.5 and 1 millimeter. With the aim to obtain a carrier plate with a thickness of approximately 6 millimeters, 4 to 20 of such sheets have to be laminated on top of each other, for example, ten layers with a thickness of approximately 0.6 millimeters. Of course, multi-layered fiber cement boards or other mineral carrier plates can also be manufactured according to another method.

As mentioned above, the mineral carrier plate may be multi-layered and preferably comprise 4 to 20 layers. The present invention is applied in particular with covering elements on the basis of such carrier plates. Such carrier plates can have the disadvantage that the binding strength between the various layers is considerably lower than the binding strength internally in each layer. This disadvantage leads to the easier splitting of the mineral carrier plate between the individual layers, for example, when working at or treating the lateral edges. Such treatment can arise, for example, when realizing the recesses and protrusions with milling tools. A risk of splitting also exists when engaging recesses and protrusions. Preferably, at least a part of the decor layer of these covering elements is applied in liquid form. With a liquid application, a certain penetration and reinforcement of the upper layer or upper layers of the carrier plate can be achieved. A penetration and reinforcement of the upper layer is advantageous at the lateral edge comprising the recess. The recess disturbs the balance or equilibrium of the layers, and possibly the layers, which border the recess in upward direction, can deform or bend in upward direction. Also with the engagement of recesses and protrusions forces on these layers may occur which have a similar effect. An at least partial penetration of the liquid material of the decor layer can at least counteract this effect. Preferably, the liquidly applied material penetrates at least so deep into the carrier plate that the material penetrates the upper layer at least partially and also at least partially penetrates into the adjacent layer situated there below. According to this embodiment, also an improved laminating strength between the two upper layers is achieved. In this case, the risk of tearing between the upper layers, or splitting, is reduced, for example, when forming the recesses and protrusions with milling tools or with other cutting tools, or when engaging recesses and protrusions.

It is clear that the covering element of the invention preferably shows at least a superficial penetration of the material of the decor layer into the carrier plate. It is also clear that this herein relates to the material of the lower layer or layers of the decor layer. Such penetration is of interest with multi-layered plates, as mentioned above, as well as with single-layered plates. In both cases, an improved adhesion of the decor layer on the carrier plate is achieved. Further, a possibly brittle decor layer, for example, in the case of digital printing, hardens by this anchoring in the carrier plate. In carrier plates containing, in part, fibers, such as process fibers, of cellulose or another, preferably absorbent, material, adherence is further improved. In order to even more improve such penetration, the carrier plate preferably has a porosity of more than 10 percent by volume, preferably between 15 and 40 percent by volume.

Further, it is clear that an at least partial penetration of the material of the decor layer can be achieved with digital printing, with a mixed layer and in those cases that the decor layer comprises a foil glued onto the carrier plate.

With digital printing, the material of a basic layer or of a plurality of basic layers can penetrate into the carrier plate. Preferably, a penetration of the liquid material of the basic layer with a depth of at least 0.1 millimeters is achieved, preferably on the entire surface or on at least 50 percent of the surface. The achieved penetration depth preferably is greater than 15 percent of the thickness of a layer of the carrier plate, in the cases in which a multi-layered carrier plate is used. In order to achieve this and still obtain an excellent adhesion with the further layers of the decor layer, the basic layer preferably is liquidly applied in one or more single layers. A preferred layer construction prior to the digital print on the mineral carrier plate of the invention is as follows:

- at least two layers, preferably at least three layers, of a basic layer, wherein this basic layer is based on a coupling agent, wherein each layer preferably has a wet weight of 5 to 50 g/m$^2$. This basic layer can be colored, however, preferably is transparent. With the layers of the coupling agent, a penetration of at least 0.1 millimeters into the carrier plate is achieved and a closed layer is formed on the carrier plate surface to be printed;
- possibly, and preferably in the cases where the coupling agent has not been colored, at least one color pigment-containing layer of a basic color in accordance with the decor to be achieved. With this layer, a uniform basic color is achieved on the surface to be printed;
- one or more color pigment-containing digital printing layers for forming a decor, for example, a decor for wood imitation or stone imitation;
- one or more transparent top layers, preferably polymer-containing top layers, as well as top layers of polyurethane or acrylic.

In a mixed layer, the polymer matrix material can penetrate into the carrier plate. Preferably, a penetration depth of at least 0.1 millimeters is reached, preferably on the entire surface or on at least 50 percent of the surface. The achieved penetration depth preferably is greater than 15 percent of the thickness of a layer of the carrier plate, in those cases in which a multi-layered carrier plate is used. In order to obtain an excellent adhesion, first one or more layers of matrix material can be provided in liquid form on the carrier plate. These layers preferably contain less or no filler material compared to further layers of the decor layer. Preferably, first layers of the pure matrix material are provided until a closed layer is formed on the carrier plate surface to be decorated. Subsequently then one or more mixed layers can be provided and/or the filler can be provided separately, for example, by strewing.

With the decor layer comprising a foil glued onto the carrier plate, the glue preferably is applied in liquid form and in this manner penetrates at least partially into the carrier plate. Preferably, a penetration depth of at least 0.1 millimeter is achieved, preferably on the entire surface or on at least 50 percent of the surface. The achieved penetration depth preferably is greater than 15 percent of the thickness of a layer of the carrier plate, in the cases in which a multi-layered carrier plate is used. Preferably, by means of the glue application a closed layer is formed on the carrier plate surface to be decorated.

The following terms are used synonymously: basic layer—primer; mineral carrier plate—a carrier plate comprising at least a mineral material; covering element—covering board.

The invention also relates to a covering composed of a plurality of covering elements joined together by their recesses and protrusions formed at the lateral edges.

BRIEF DESCRIPTION OF THE DRAWINGS

The invention is described below by way of example by the schematic drawing, wherein.

DETAILED DESCRIPTION

Figure 1:
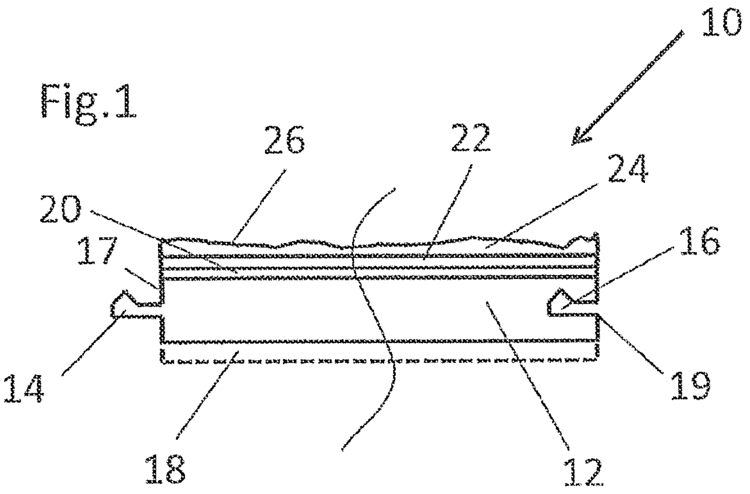
FIG. 1 shows a cross-section through a first covering element, which comprises a decor layer in the digital printing method.

FIG. 1 shows a plate-shaped covering element 10, which, with other covering elements 10, can be composed in a planar manner to a floor covering, ceiling covering and/or wall covering, for outdoor use as well. The covering element 10 contains a mineral-containing carrier plate 12, which, at its lateral edges 17, 19 facing away from each other, comprises either protrusions 14 or recesses 16, which, with covering elements situated next to each other, form mating tongue/groove connections. So, in covering elements 10 situated next to each other, the protrusions 14 of one covering element 10 engage the recess 16 of the adjacent covering element 10. Optionally, an insulation layer 18 can be arranged on the rear side, underside, respectively, of the carrier plate 12 for footfall sound insulation and/or thermal insulation. This layer preferably is provided directly on the carrier plate 12 or glued thereon.

On the front side, upper side, respectively, of the carrier plate 12 there is first of all a basic layer 20, which comprises color pigments in order to give the front side, upper side, respectively, of the carrier plate 12 a desired basic color. This basic layer preferably is optional, because basically, with a corresponding choice of the material of the carrier plate 12, the color of the carrier plate can be suitable as a basis for a subsequent digital printing method. A digital print layer 22 is provided on the basic layer 20 in a digital printing method, wherein this digital print layer 22 may be provided not over the entire surface, but only in the areas to be printed. Onto this digital print layer, basic layer 20, respectively, at least one top layer 24 is provided, which in particular consists of a UV-hardening polyurethane or acrylic. A structure 26 is provided on this top layer 24 by an embossing roller, in particular by the hot coating method, which structure preferably reinforces the impression created by the digital print layer 22. In this manner, a covering board is created, which reflects the impression of a desired material very well, for example, a wood layer, a leather layer, a stone layer or a cork layer.

The top layer 24 can also be formed by a plurality of layers of an in particular UV-hardening polymer. The application of the top layer 24 and the profiling thereof preferably is performed in the hot coating method by means of a hot roller. The hot coating method is known as such.

Figure 2:
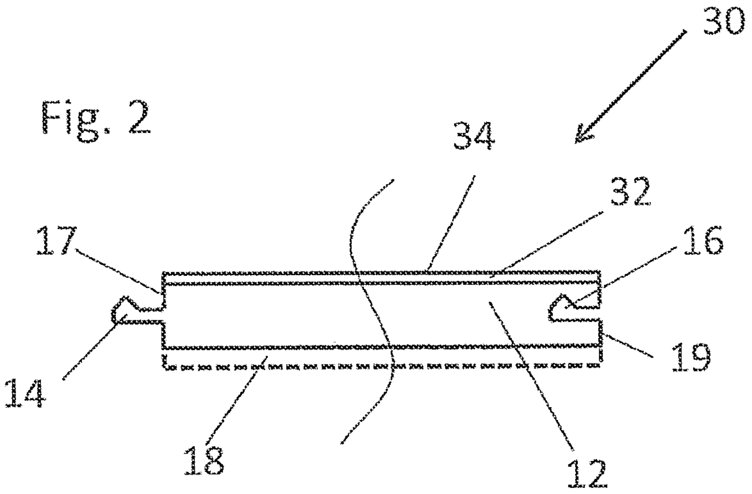
FIG. 2 shows a cross-section according to FIG. 2 of a second covering element, which comprises a mineral carrier plate with a mixed layer applied in liquid or solid form.

FIG. 2 shows an alternative embodiment of a covering element, wherein identical or functionally identical parts in respect to FIG. 1 are provided with the same reference numerals. The floor covering element 30 from FIG. 2 also comprises a carrier plate 12, which is mineral-containing and comprises protrusions 14 and recesses 16 on lateral edges 17,19 facing away from each other. The protrusions and recesses of this tongue/groove system are shown only schematically. In practice, the protrusions 14 and recesses 16 are manufactured as described in document EP 0843763, which document hereby is made subject of the present application. In this context, it should be clarified that a covering element of the invention usually is rectangular, in particular square, and that the recesses and protrusions are formed on four sides, wherein the recesses 16 preferably are arranged on two sides situated next to each other and the protrusions 14 on the other two sides situated next to each other.

On the rear side or underside thereof, the mineral carrier plate 12 optionally comprises an insulation layer 18, as already known from FIG. 1. This insulation layer is optional and only necessary if a desired footfall sound insulation and/or thermal insulation are desired. Moreover, this insulation layer, if required, can also be applied as a counterbalancing backing layer. On its upper side, the carrier plate 12 comprises a mixed layer 32 of a polymer and a filler. As a filler, for example, leather, cork, wood, stone, mineral powders, sand are suitable, wherein these materials can be provided in the polymer matrix of the mixed layer either as particles or as fibers. The mixed layer preferably is an elastomer layer, which in particular hardens to a modulus of elasticity of 0.05-0.5 GPa, by which it achieves a rubber-like elasticity. In this manner, for example, an impression of cork, wood or leather can be pronounced very well. Such covering element is very suitable as a wall covering element.

The invention is not limited to the represented exemplary embodiments but can be varied at choice within the scope of protection of the accompanying claims.

REFERENCE NUMERAL LIST

10 Wall, ceiling or floor covering element (first embodiment)
12 mineral carrier plate
14 protrusion—tongue of the tongue/groove connection
16 recess—groove of the tongue/groove connection
17 first lateral edge
18 insulation layer
19 second lateral edge
20 basic layer—primer—coupling agent
22 digital printing layer
24 transparent top layer
30 wall, ceiling or floor covering element (second embodiment)
32 mixed layer, in particular applied in liquid form
34 optionally structured surface, in particular by embossing roller

The invention claimed is:

1. A covering element comprising:

a carrier plate comprising mineral particles bonded together by a polymeric adhesion matrix material;

complementary recesses and protrusions formed, respectively, on opposing lateral edges of the carrier plate, such that, in an assembled condition of two or more covering elements, the complementary recesses and protrusions are configured to engage with complementary protrusions and recesses, respectively, of another of the two or more covering elements; and a decor layer that comprises a polymer and is on a front side of the carrier plate;

wherein the decor layer comprises at least at least one, color pigment-containing, printing layer;

wherein the decor layer comprises an unprinted foil based on polyvinyl chloride, polyethylene terephthalate, or polyolefin;

wherein the decor layer comprises a polymer-containing transparent top layer that contains polyurethane or acrylic; and wherein the recesses and protrusions are arranged solely in the carrier plate.

2. The covering element of claim 1, wherein the carrier plate has a thickness between 2 and 15 millimeters.

3. The covering element of claim 1, wherein the transparent top layer containing polyurethane or acrylic is UV-hardened or electron beam hardened.

4. The covering element of claim 1, wherein the polymer-containing transparent top layer comprises corundum particles.

5. The covering element of claim 1, wherein the polymer-containing transparent top layer is textured.

6. The covering element of claim 1, comprising an insulating layer on a rear side of the carrier plate, the insulating layer being an elastomer layer, a product comprising cork, or a foamed polymer layer.

7. The covering element of claim 1, wherein the carrier plate has an upper side, wherein the carrier plate comprises on the upper side a mixed layer of a polymer and a filler.

8. The covering element of claim 7, wherein the mixed layer is an elastomer layer.

9. The covering element of claim 1, wherein the carrier plate is a multi-layered board.

10. The covering element of claim 1, wherein the decor layer comprises at least one base layer on the carrier plate, wherein the at least one, color pigment-containing, printing layer is a color pigment-containing, digital printing layer arranged at least partially on the base layer.

11. The covering element of claim 10, wherein the base layer is a color pigment-containing base layer or a transparent base layer.

12. The covering element of claim 1, wherein the printing layer is a printing foil.

13. The covering element of claim 12, wherein the printing foil is a foil selected from the group consisting of polyvinylchloride, polyethylene terephthalate, and polyolefin.

* * * * *